United States Patent
Yu et al.

(10) Patent No.: US 9,070,923 B2
(45) Date of Patent: Jun. 30, 2015

(54) ATTACH AND DETACH DEVICE OF BATTERY FOR ELECTRIC VEHICLE

(75) Inventors: Chi-Man Yu, Bucheon-si (KR); Joo-Sub Sim, Goyang-si (KR); Yong-Geu Park, Incheon (KR); Woong-Sung Jang, Bucheon-si (KR); Yun-ha Kim, Seoul (KR); Jun-Seok Park, Seoul (KR); Woong-Chul Choi, Seoul (KR); Jay-Il Jeong, Seoul (KR); Won-Kyu Kim, Seoul (KR)

(73) Assignees: MOTEX PRODUCTS CO., LTD., Bucheon-si, Gyeonggi-do (KR); INDUSTRY-UNIVERSITY COOPERATION FOUNDATION OF KOREA AEROSPACE UNIVERSITY, Seoul (KR); KOOKMIN UNIVERSITY INDUSTRY ACADEMY COOPERATION FOUNDATION, Goyang-si, Gyeonggi-do (KR)

( * ) Notice: Subject to any disclaimer, the term of this patent is extended or adjusted under 35 U.S.C. 154(b) by 306 days.

(21) Appl. No.: 13/532,138

(22) Filed: Jun. 25, 2012

(65) Prior Publication Data

US 2013/0153315 A1    Jun. 20, 2013

(30) Foreign Application Priority Data

Dec. 16, 2011  (KR) .......................... 10-2011-0136669
Dec. 29, 2011  (KR) .......................... 10-2011-0145999

(51) Int. Cl.
| | |
|---|---|
| *B60R 16/04* | (2006.01) |
| *H01M 2/10* | (2006.01) |
| *B60S 5/06* | (2006.01) |
| *B60K 1/04* | (2006.01) |

(52) U.S. Cl.
CPC ................ *H01M 2/1005* (2013.01); *B60S 5/06* (2013.01); *H01M 2/1077* (2013.01); *H01M 2/1083* (2013.01); *H01M 2220/20* (2013.01); *Y02T 90/124* (2013.01); *B60K 1/04* (2013.01); *B60K 2001/0466* (2013.01); *B60Y 2200/143* (2013.01)

(58) Field of Classification Search
CPC ......... B60R 16/04; B60S 5/06; Y02T 90/124; B60K 2001/0466; B60K 1/04; H01M 2/1005; H01M 2/1077; H01M 2/1083; H01M 2220/20; B60Y 2200/143
USPC ............ 180/68.5; 320/109; 104/34; 700/213; 414/373
See application file for complete search history.

(56) References Cited

U.S. PATENT DOCUMENTS

| | | | | | |
|---|---|---|---|---|---|
| 4,087,895 | A | * | 5/1978 | Etienne ............................ | 29/252 |
| 4,450,400 | A | * | 5/1984 | Gwyn ............................. | 320/109 |
| 4,983,903 | A | * | 1/1991 | Bae et al. ....................... | 320/128 |
| 5,549,443 | A | * | 8/1996 | Hammerslag .................. | 414/809 |

(Continued)

*Primary Examiner* — J. Allen Shriver, II
*Assistant Examiner* — Jacob Meyer
(74) *Attorney, Agent, or Firm* — Sherr & Jiang, PLLC

(57) ABSTRACT

Disclosed is an electric vehicle battery attaching/detaching device including a battery having incision recesses formed on lateral portions, respectively, each incision recess having a lower engaging ledge; a battery mounting unit adapted to detachably mount the battery, the battery mounting unit having grasping holders formed on a bottom portion and adapted to engage with or disengage from the lower engaging ledges of the battery incision recesses; and a controller adapted to rotate the grasping holders in response to an electric signal so that the grasping holders engage with or disengage from the lower engaging ledges of the battery incision recesses.

9 Claims, 17 Drawing Sheets

(56) References Cited

U.S. PATENT DOCUMENTS

| | | | | |
|---|---|---|---|---|
| 5,612,606 A * | 3/1997 | Guimarin et al. | | 320/109 |
| 5,711,648 A * | 1/1998 | Hammerslag | | 414/800 |
| 5,927,938 A * | 7/1999 | Hammerslag | | 414/809 |
| 5,951,229 A * | 9/1999 | Hammerslag | | 414/398 |
| 5,998,963 A * | 12/1999 | Aarseth | | 320/109 |
| 6,014,597 A * | 1/2000 | Kochanneck | | 701/22 |
| 6,094,028 A * | 7/2000 | Gu et al. | | 320/109 |
| 6,631,775 B1 * | 10/2003 | Chaney | | 180/68.5 |
| 7,201,384 B2 * | 4/2007 | Chaney | | 180/68.5 |
| 7,389,841 B2 * | 6/2008 | Boville | | 180/68.5 |
| 7,413,045 B2 * | 8/2008 | Tien | | 180/68.5 |
| 7,520,355 B2 * | 4/2009 | Chaney | | 180/68.5 |
| 7,602,143 B2 * | 10/2009 | Capizzo | | 320/109 |
| 8,013,571 B2 * | 9/2011 | Agassi et al. | | 320/109 |
| 8,022,666 B2 * | 9/2011 | Li | | 320/109 |
| 8,164,300 B2 * | 4/2012 | Agassi et al. | | 320/104 |
| 8,164,302 B2 * | 4/2012 | Capizzo | | 320/109 |
| 8,453,778 B2 * | 6/2013 | Bannier et al. | | 180/68.5 |
| 8,461,804 B1 * | 6/2013 | Capizzo | | 320/109 |
| 8,511,413 B2 * | 8/2013 | Ojima et al. | | 180/68.5 |
| 8,689,918 B2 * | 4/2014 | Yu et al. | | 180/68.5 |
| 8,694,155 B2 * | 4/2014 | Yu | | 700/228 |
| 8,825,202 B2 * | 9/2014 | Yu | | 700/228 |
| 2002/0079152 A1 * | 6/2002 | Van Hout et al. | | 180/68.5 |
| 2003/0209375 A1 * | 11/2003 | Suzuki et al. | | 180/65.3 |
| 2004/0035617 A1 * | 2/2004 | Chaney | | 180/65.1 |
| 2005/0274556 A1 * | 12/2005 | Chaney | | 180/68.5 |
| 2008/0258682 A1 * | 10/2008 | Li | | 320/109 |
| 2010/0141206 A1 * | 6/2010 | Agassi et al. | | 320/109 |
| 2010/0145717 A1 * | 6/2010 | Hoeltzel | | 705/1.1 |
| 2011/0044791 A1 * | 2/2011 | Agassi et al. | | 414/806 |
| 2011/0123309 A1 * | 5/2011 | Berdelle-Hilge et al. | | 414/800 |
| 2011/0139527 A1 * | 6/2011 | Bannier et al. | | 180/68.5 |
| 2011/0251935 A1 * | 10/2011 | German et al. | | 705/30 |
| 2011/0297470 A1 * | 12/2011 | Heichal et al. | | 180/68.5 |
| 2011/0303509 A1 * | 12/2011 | Agassi et al. | | 198/604 |
| 2012/0068664 A1 * | 3/2012 | Franzen et al. | | 320/109 |
| 2012/0111654 A1 * | 5/2012 | Origuchi | | 180/68.5 |
| 2012/0217077 A1 * | 8/2012 | Ojima et al. | | 180/68.5 |
| 2012/0233850 A1 * | 9/2012 | Hozumi et al. | | 29/729 |
| 2012/0306445 A1 * | 12/2012 | Park et al. | | 320/109 |
| 2012/0316671 A1 * | 12/2012 | Hammerslag et al. | | 700/225 |
| 2012/0321381 A1 * | 12/2012 | Ohgitani et al. | | 403/376 |
| 2012/0326107 A1 * | 12/2012 | Ojima et al. | | 254/89 R |
| 2013/0037337 A1 * | 2/2013 | Auer et al. | | 180/68.5 |
| 2013/0104361 A1 * | 5/2013 | Corfitsen | | 29/402.08 |
| 2013/0153315 A1 * | 6/2013 | Yu et al. | | 180/68.5 |
| 2013/0156533 A1 * | 6/2013 | Yu et al. | | 414/729 |
| 2013/0193919 A1 * | 8/2013 | Hill et al. | | 320/109 |
| 2013/0221918 A1 * | 8/2013 | Hill et al. | | 320/109 |
| 2013/0342310 A1 * | 12/2013 | PARK et al. | | 340/5.7 |
| 2013/0343842 A1 * | 12/2013 | YU, Chi-Man | | 414/273 |
| 2014/0002019 A1 * | 1/2014 | Park et al. | | 320/109 |
| 2014/0070767 A1 * | 3/2014 | Morris et al. | | 320/109 |
| 2014/0100689 A1 * | 4/2014 | YU, Chi-Man | | 700/218 |
| 2014/0196966 A1 * | 7/2014 | OHGITANI et al. | | 180/68.5 |

* cited by examiner

ATTACH AND DETACH DEVICE OF BATTERY FOR ELECTRIC VEHICLE

CROSS REFERENCE TO PRIOR APPLICATIONS

The present application claims priority under 35 U.S.C. §119 to Korean Patent Application No. 10-2011-0136669 (filed on Dec. 16, 2011) and Korean Patent Application No. 10-2011-0145999 (filed on Dec. 29, 2011), which are all hereby incorporated by reference in their entirety.

BACKGROUND

The present invention relates to a device for attaching/detaching a battery for an electric vehicle, and more particularly, to an electric vehicle battery attaching/detaching device adapted to attach/detach and exchange a battery, which is mounted on a battery mounting unit of an electric vehicle and which is about to be discharged, and a battery, charging of which is completed and which is loaded on a separate loader.

In general, vehicles commonly use, as their fuel, petroleum (e.g. gasoline, light oil) and gases (e.g. LPG, LNG), the deposits of which are limited, the prices of which are on the rise, and which cause environmental contamination. Therefore, there has been an increasing demand for alternative fuels.

Electric batteries have recently been commercialized to a considerable extent as alternative vehicle fuels, but they need to be charged for a long period of time, which degrades efficiency and makes their widespread use difficult.

SUMMARY

Therefore, the present invention has been made in view of the above-mentioned problems, and an aspect of the present invention is to provide an electric vehicle battery attaching/detaching device which, instead of charging an electric vehicle battery for a long period of time, automatically and conveniently exchanges a nearly discharged battery with a fully-charged battery within a short period of time.

Another aspect of the present invention is to provide an electric vehicle battery attaching/detaching device which, in the case of a bus, has a plurality of fully-charged batteries arranged at a specific bus stop, for example, and which easily detaches and exchanges one of the fully-charged batteries with a nearly discharged battery of the bus.

Another aspect of the present invention is to provide an electric vehicle battery attaching/detaching device capable of guaranteeing that batteries are easily attached/detached even if the battery mounting unit of an electric vehicle is not positioned on the same vertical line with the battery attaching/detaching unit of a movement device but is displaced to some extent for various reasons (tire air pressure difference, concentrated distribution of passengers, the driver's difficulty in stopping the electric vehicle at the accurate exchange location, etc.).

Another aspect of the present invention is to provide an electric vehicle battery attaching/detaching device configured in such manner that, when a battery is seated and set at the accurate location on the battery mounting unit, the battery is firmly grasped on the battery mounting unit and prevented from escaping from the battery mounting unit even if the electric vehicle vibrates or turns upside down, for example.

In accordance with an aspect of the present invention, there is provided an electric vehicle battery attaching/detaching device including a battery mounting unit formed on an electric vehicle and adapted to detachably mount a battery; a loader having a plurality of battery stands, each battery stand being adapted to detachably mount a fully-charged battery to be exchanged with the battery mounted on the battery mounting unit; and a battery attaching/detaching unit adapted to move along X-axis, Y-axis, and Z-axis between the battery mounting unit and the battery stand by means of a movement device, detach a battery mounted on the battery mounting unit or the battery stand, and exchange/mount the battery on the battery stand or the battery mounting unit.

Preferably, the battery has coupling holes formed near corners, upper surface incisions formed on both lateral portions, respectively, each upper surface incision having an engaging ledge formed at a predetermined height from a bottom portion, and lower surface incisions formed on front and rear portions, respectively, each lower surface incision having an engaging ledge formed at a predetermined height from a top portion.

Preferably, the battery mounting unit includes a bottom portion of a predetermined area so that the battery is seated and supported; coupling protrusions extending a predetermined length in a direction perpendicular to the bottom portion, the coupling protrusions being positioned on an identical vertical line with the coupling holes of the battery; and grasping holders adapted to engage with or disengage from the engaging ledges of the upper surface incisions of the battery by means of elastic force.

Preferably, the grasping holders are adapted to make hinge rotation in a forward/backward direction by means of elastic members, the grasping holders have stepped portions formed to horizontally engage with the engaging ledges formed on the upper surface incisions of the battery, respectively, and a slanted surface portion is formed to be slanted upwards from an inner end surface of each stepped portion in an outward direction.

Preferably, the movement device includes a pair of fixed guide rails installed horizontally on the loader; a variable guide rail installed on the fixed guide rails in a perpendicular direction and adapted to move horizontally along X-axis or Y-axis; and a movable rail adapted to move horizontally along Y-axis or X-axis with regard to the variable guide rail, as well as move vertically along Z-axis, the battery attaching/detaching unit being installed on a lower end of the movable rail.

Preferably, the battery attaching/detaching unit is installed on the movement device to be able to move along X-axis, Y-axis, and Z-axis, and the battery attaching/detaching unit includes a main unit shaped and sized in conformity with the battery; grasping units formed on front and rear surfaces of the main unit, respectively, and adapted to make hinge rotation vertically and horizontally in response to electric signals; and disengaging units formed on left and right surfaces of the main unit, respectively, and adapted to make hinge rotation vertically and horizontally in response to electric signals.

Preferably, the grasping units are positioned to vertically correspond to the lower surface incisions of the battery and have a corresponding number, each grasping unit has a vertical unit adapted to make hinge rotation vertically or horizontally in response to an electric signal and a horizontal unit extending from an end of the vertical unit in a perpendicular direction, and the horizontal units are adapted to horizontally engage with the engaging ledges formed on the lower surface incisions of the battery, when the grasping units are folded, and grasp the battery.

Preferably, the disengaging units are positioned to vertically correspond to the upper surface incisions of the battery and the grasping holders of the battery mounting unit and have a corresponding number.

Preferably, the battery stand includes a bottom portion of a predetermined area so that the battery is seated and supported; and coupling protrusions extending a predetermined length in a direction perpendicular to the bottom portion, the coupling protrusions being positioned on an identical vertical line with the coupling holes of the battery.

Preferably, grasping holders are installed on the bottom portion of the battery stand and adapted to engage with or disengage from the engaging ledges of the upper surface incisions of the battery by means of elastic force.

In accordance with another aspect of the present invention, there is provided an electric vehicle battery attaching/detaching device including a battery mounting unit formed on an electric vehicle and adapted to detachably mount a battery; a loader having a plurality of battery stands, each battery stand being adapted to detachably mount a fully-charged battery to be exchanged with the battery mounted on the battery mounting unit; and a battery attaching/detaching unit adapted to move along X-axis, Y-axis, and Z-axis between the battery mounting unit and the battery stand by means of a movement device, detach a battery mounted on the battery mounting unit or the battery stand, and exchange/mount the battery on the battery stand or the battery mounting unit so that, even if the battery attaching/detaching unit is displaced vertically or horizontally within a predetermined tolerance range from an identical vertical line shared by the battery mounting unit or the battery stand, the battery is lowered and seated on the battery mounting unit or the battery stand.

Preferably, the battery has cone-type recesses formed near its bottom corners.

Preferably, the cone-type recesses have a cone shape so that the interval of entering ends is large but decreases inwards.

Preferably, the battery has incision recesses formed on both lateral portions, respectively, each incision recess having upper and lower engaging ledges formed at predetermined heights from bottom and top portions, respectively.

Preferably, the battery mounting unit has a bottom portion of a predetermined area so that the battery is seated and supported and cone-type protrusions formed on the bottom portion and positioned to correspond to the cone-type recesses, the cone-type protrusions extending vertically a predetermined length.

Preferably, the battery mounting unit has grasping holders adapted to engage with or disengage from the lower engaging ledges of the battery incision recesses.

Preferably, the grasping holders are adapted to rotate a predetermined angle about center shafts in response to electric signals to engage with or disengage from the lower engaging ledges and are provided with stepped portions to horizontally engage with the lower engaging ledges.

Preferably, the battery has taper surfaces formed on lower portions of respective lateral surfaces up to a predetermined height, the taper surfaces defining slanted surfaces of a predetermined angle so that a sectional area decreases downwards.

Preferably, the taper surfaces have an inclination angle of 10-20°.

Preferably, anti-wear cover plates are positioned to straddle the taper surfaces of front, rear, left, and right surfaces of the battery and front, rear, left, and right surfaces near upper portions of the taper surfaces by a predetermined interval.

Preferably, guide pieces are installed near respective front, rear, left, and right corners of the bottom portion of the battery mounting unit and adapted to contact the taper surfaces of the battery, when the battery descends to the battery mounting unit, and guide the battery so that the battery slides frictionally to be seated in an accurate position.

Preferably, each guide piece has a slanted surface formed on an inner surface at an angle of 10-20°.

In accordance with another aspect of the present invention, there is provided an electric vehicle battery attaching/detaching device including a battery having incision recesses formed on lateral portions, respectively, each incision recess having a lower engaging ledge; a battery mounting unit adapted to detachably mount the battery, the battery mounting unit having grasping holders formed on a bottom portion and adapted to engage with or disengage from the lower engaging ledges of the battery incision recesses; and a controller adapted to rotate the grasping holders in response to an electric signal so that the grasping holders engage with or disengage from the lower engaging ledges of the battery incision recesses.

Preferably, the controller includes a driving motor installed on one side of a rear surface of the battery mounting unit; a driving shaft installed along an identical axis with a shaft of the driving motor; driven shafts installed in a direction perpendicular to the driving shaft and adapted to rotate so that rotation of the driven shafts is interlinked with rotation of the driving shaft; worm gears adapted to rotate so that rotation of the worm gears is interlinked with rotation of the driven shafts; and worm wheels adapted to mesh with the worm gears and installed on lower center shafts of the grasping holders, respectively.

Preferably, the driven shafts and the worm wheels are connected and installed to be interlinked by reduction gears of at least one stage.

Preferably, bevel gears are installed on the driving shaft, bevel gears are installed on first ends of the driven shafts, and the bevel gears mesh with each other in a perpendicular direction so that the driven shafts are interlinked and rotated in a direction perpendicular to the driving shaft.

Preferably, the grasping holders have stepped portions formed to horizontally engage with the lower engaging ledges of the battery incision recesses.

The electric vehicle battery attaching/detaching device according to the present invention is advantageous as follows: a nearly discharged battery mounted on the battery mounting unit of an electric vehicle is easily exchanged with one of fully-charged batteries on the loader installed at a bus stop, for example, within a short period of time, thereby improving efficiency substantially.

The electric vehicle battery attaching/detaching device guarantees that batteries are easily attached/detached to/from the battery mounting unit even if the battery mounting unit of an electric vehicle is not positioned on the same vertical line with the battery attaching/detaching unit of a movement device but is displaced to some extent for various reasons (tire air pressure difference, concentrated distribution of passengers, the driver's difficulty in stopping the electric vehicle at the accurate exchange location, etc.).

Furthermore, when a battery is seated and set at the accurate location on the battery mounting unit, the battery is firmly grasped on the battery mounting unit and prevented from escaping from the battery mounting unit even if the electric vehicle vibrates or turns upside down, for example.

DETAILED DESCRIPTION

Hereinafter, preferred embodiments of the present invention will be described in detail with reference to the accompanying drawings.

First Embodiment

Figure 1:
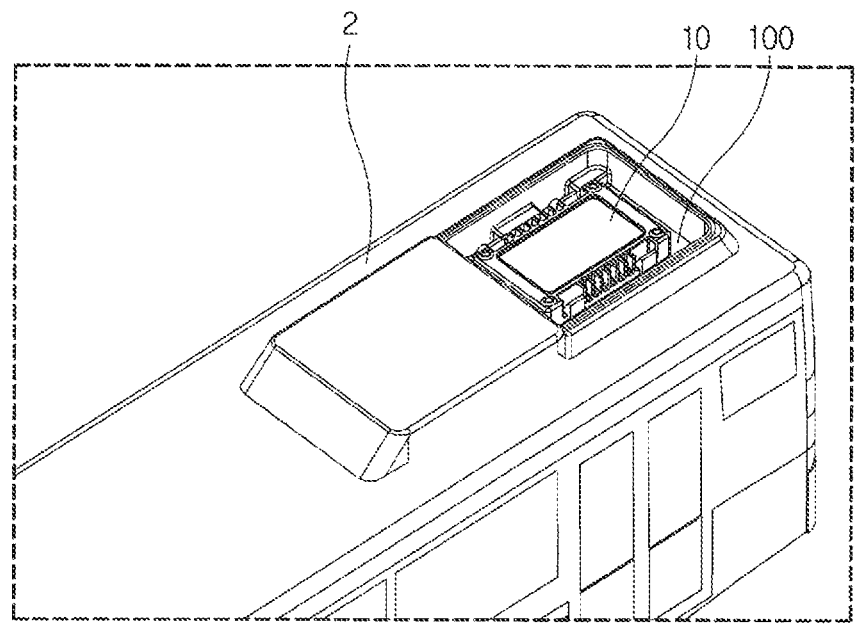
FIG. 1 is a partial perspective view illustrating a battery installed on one side of the upper surface of an electric vehicle to use an electric vehicle battery attaching/detaching device according to a first embodiment of the present invention.
Figure 2:
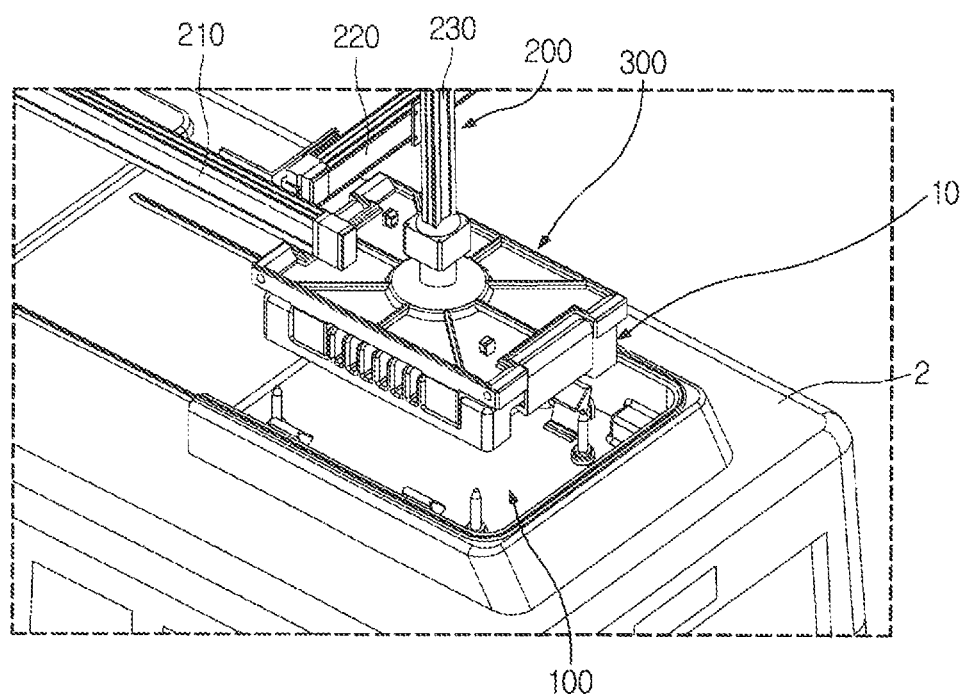
FIG. 2 is a partial perspective view illustrating a process of picking up a battery mounted on an electric vehicle using a electric vehicle battery attaching/detaching device according to the first embodiment of the present invention shown in FIG. 1.
Figure 3:
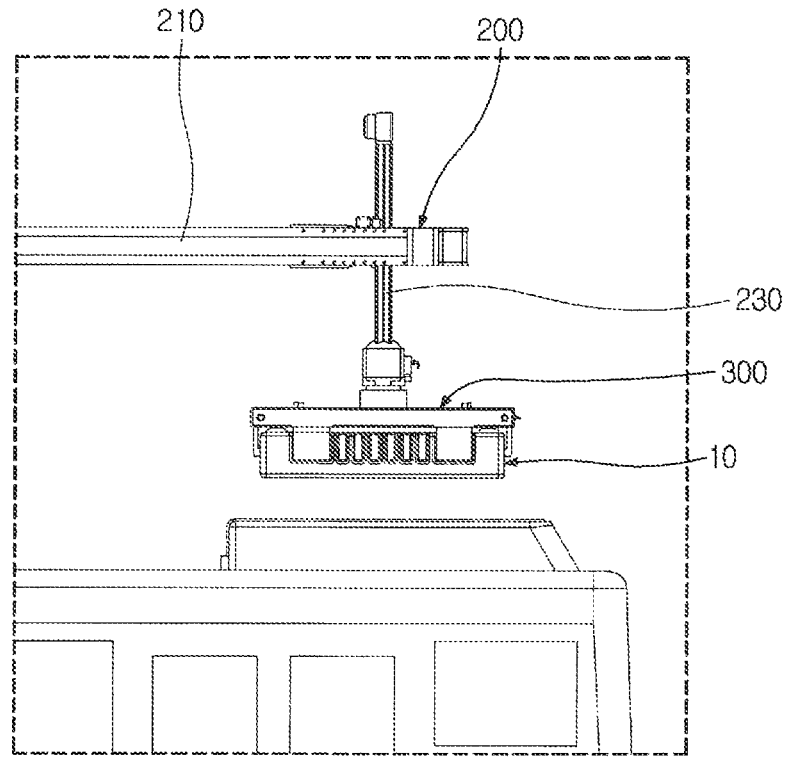
FIG. 3 is a front view of FIG. 2.
Figure 4:
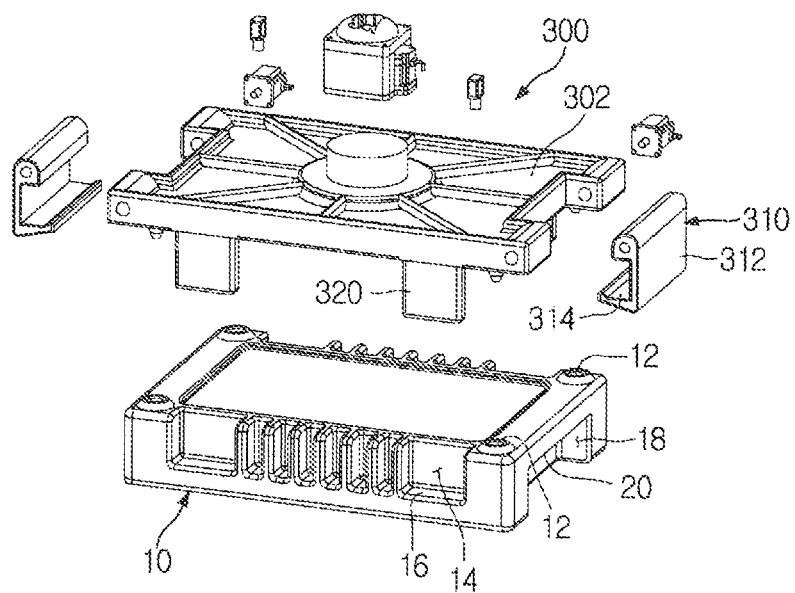
FIG. 4 is an exploded perspective view of the electric vehicle battery attaching/detaching device according to the first embodiment of the present invention.

FIG. 1 is a partial perspective view illustrating a battery installed on one side of the upper surface of an electric vehicle to use an electric vehicle battery attaching/detaching device according to a first embodiment of the present invention; FIG. 2 is a partial perspective view illustrating a process of picking up a battery mounted on an electric vehicle using the electric vehicle battery attaching/detaching device according to the first embodiment of the present invention shown in FIG. 1; FIG. 3 is a front view of FIG. 2; and FIG. 4 is an exploded perspective view of the electric vehicle battery attaching/detaching device according to the first embodiment of the present invention.

As shown, the electric vehicle battery attaching/detaching device according to a first embodiment of the present invention includes a loader (not shown) having a plurality of batteries, charging of which has been completed (hereinafter, referred to as fully-charged batteries), loaded thereon; an electric vehicle battery mounting unit 100; and a battery attaching/detaching unit 300 adapted to move between the battery mounting unit 100 and the loader along X-axis, Y-axis, and Z-axis by means of a movement device 200, detach a battery 10 mounted on the battery mounting unit 100 or the loader, and again exchange/mount the battery 10 on the loader or the battery mounting unit 100.

It will be assumed in the description of the first embodiment of the present invention that the electric vehicle is a bus 2.

The battery attaching/detaching unit 300 is supposed to move along X-axis, Y-axis, and Z-axis with regard to the loader, which has a plurality of fully-charged batteries loaded thereon, and the battery mounting unit 100 of the bus 2. To this end, the battery mounting unit 100 is preferably installed on top of the bus 2, and the loader of fully-charged batteries is preferably positioned higher than the bus 2.

The battery attaching/detaching unit 300 is moved by the movement unit 200 along X-axis, Y-axis, and Z-axis with regard to the loader and the battery mounting unit 100 of the bus 2. Therefore, the movement unit 200 includes a pair of fixed guide rails 210 installed on the loader horizontally, a variable guide rail 220 installed on the fixed guide rails 210 in a perpendicular direction and adapted to move horizontally along X-axis or Y-axis, and a movable rail 230 adapted to move horizontally along Y-axis or X-axis with regard to the variable guide rail 220 and move vertically along Z-axis. The battery attaching/detaching unit 300 is preferably installed on the lower end of the movable rail 230.

Particularly, the variable guide rail 220 is adapted to move horizontally along X-axis or Y-axis with regard to the pair of fixed guide rails 210, which are installed in parallel on the loader having a plurality of fully-charged batteries loaded thereon. The movable rail 230 is adapted to move horizontally along Y-axis or X-axis with regard to the variable guide rail 220, as well as move vertically along Z-axis. Therefore, the battery attaching/detaching unit 300, which is installed on the lower end of the movable rail 230, can pick up and exchange a fully-charged battery loaded on the loader and a battery about to be discharged (hereinafter, referred to as a discharged battery) mounted on the battery mounting unit 100 of the bus 2.

The battery attaching/detaching unit 300 according to the first embodiment of the present invention is supposed to move the battery 10 along X-axis, Y-axis, and Z-axis, making it crucial to safely grasp the battery 10. The battery 10 also needs to be stably retained on the battery mounting unit 100 of the bus 2 and on each battery support (not shown) of the loader. Therefore, the battery 10 is structured to be stably retained on the battery mounting unit 100 and on each battery stand of the loader, as well as on the battery attaching/detaching unit 300. Such a structure of the battery 10, which is applied to the present invention, will now be described.

The battery 10, which is applied to the battery attaching/detaching device according to the first embodiment of the present invention, has coupling holes 12 formed near respective corners so that it is retained in the accurate position on the battery mounting unit 100 of the bus 2 or on a battery stand of the loader; upper surface incisions 14 formed on both lateral surfaces and provided with engaging ledges 16 at a predetermined height from the bottom portion, respectively; and lower surface incisions 18 formed on front and rear surfaces and provided with engaging ledges 20 at a predetermined height from the top portion, respectively.

The battery 10, which has the above-mentioned construction, is mounted while being retained by the battery mounting unit 100 or the battery stand, as will be described later.

The battery mounting unit 100 or the battery stand has a bottom portion 102 of a predetermined area, on which the battery 10 is seated and supported. The bottom portion 102 has engaging rods 104 adapted to be inserted into the coupling holes 12 formed on respective corners of the battery 10. In addition, grasping holders 106 are formed to engage with the engaging ledges 16 of the upper surface incisions 14 of the battery 10 or disengage from them by means of elastic force.

The engaging rods 104 formed on the battery mounting unit 100 or the battery stand are positioned to vertically correspond to the coupling holes 12 of the battery 10 and have the corresponding number. The grasping holders 106 also have a position and a number corresponding to those of the upper surface incisions 14 of the battery 10.

The grasping holders 106 are adapted to make hinge rotation in the forward/backward direction by means of elastic members 112 (e.g. springs). Each grasping holder 106 has a stepped portion 108 adapted to horizontally engage with a corresponding engaging ledge 16 formed on the upper surface incision 14 of the battery 10 and a slanted surface 110 slanted upwards from the inner end surface of the stepped portion 108 in the outward direction.

Figure 5:
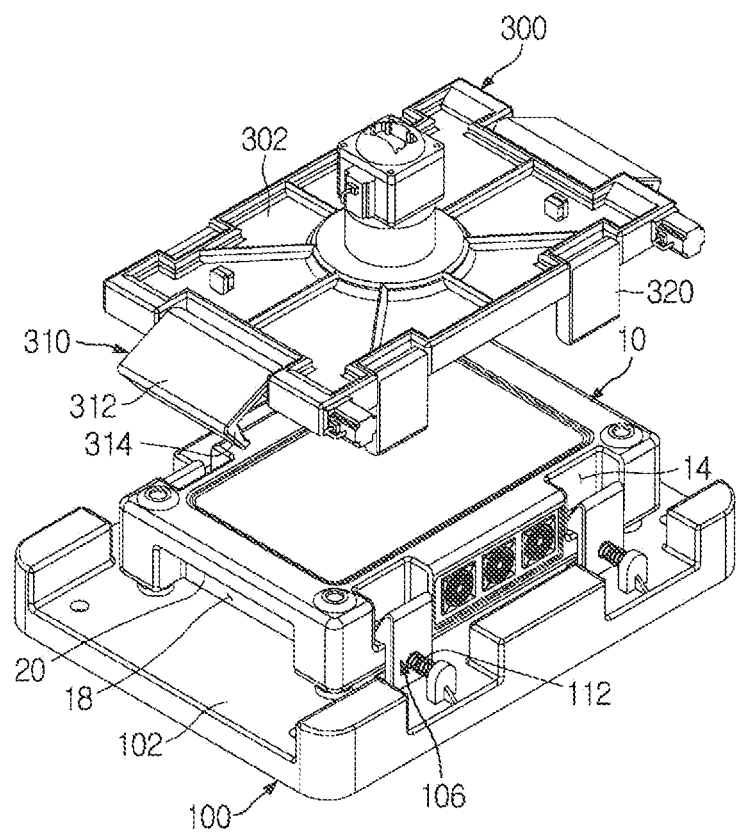
FIGS. 5-13 are perspective and front views illustrating successive processes of attaching/detaching and exchanging a battery using the electric vehicle battery attaching/detaching device according to the first embodiment of the present invention.

Therefore, when the battery 10 is mounted on the battery mounting unit 100 or the battery stand, as shown in FIG. 5, the engaging rods 104 remain inserted into the coupling holes 12 of the battery 10 to prevent the battery 10 from moving horizontally forwards/backwards/leftwards/rightwards. In addition, the stepped portions 108 of the grasping holders 106 horizontally engage with the engaging ledges 16 of the upper surface incisions 14 of the battery 10 and prevent the battery 10 from moving vertically upwards/downwards, so that the battery 10 remain grasped and retained.

It is to be noted that, although it has been assumed in the above description that the battery mounting unit 100 and the battery stand have the same construction and thus are provided with engaging rods 104 and grasping holders 106, respectively, sole construction of the bottom portion 102 and the engaging rods 104 may be sufficient, with the grasping holders 106 omitted, because the battery mounting unit 100 of the bus 2 is supposed to constrain the movement of the battery 10 in forward/backward/leftward/rightward and upward/downward directions as the bus 2 is running, while the battery stand of the loader is only supposed to retain the battery in place.

The battery attaching/detaching unit 300, as described above, is installed on the lower end of the movable rail 230 to move along X-axis, Y-axis, and Z-axis. The battery attaching/detaching unit 300 includes a main unit 302 shaped and sized in conformity with the battery 10; grasping units 310 formed on front and rear surfaces of the main unit 302, respectively, and adapted to make hinge rotation vertically and horizontally in response to electric signals; and disengaging units 320 formed on left and right surfaces of the main unit 302, respectively, and adapted to make hinge rotation vertically and horizontally in response to electric signals.

The grasping units 310 are positioned to vertically correspond to the lower surface incisions 18 of the battery 10 and have the corresponding number. Each grasping unit 310 includes a vertical unit 312 adapted to make hinge rotation vertically or horizontally in response to an electric signal and a horizontal unit 314 extending perpendicular to an end of the vertical unit 312. The horizontal units 314, when the grasping units 310 are folded, horizontally engage with the engaging ledges 20 formed on the lower surface incisions 18 of the battery 10 and thus grasp the battery 10.

The disengaging units 320 are also positioned to vertically correspond to the upper surface incisions 14 of the battery 10 and the grasping holders 106 of the battery mounting unit 100 or the battery stand and have the corresponding number.

A process of exchanging a battery, which is retained and mounted on the battery mounting unit 100 of the bus 2 or the battery stand of the loader, using the battery attaching/detaching device of the above-mentioned configuration will now be described with reference to FIGS. 5-13.

It is to be noted that the battery mounting unit 100 of the bus 2 and the battery stand formed on the loader have the same structure, as mentioned above, meaning that the structure that mounts a battery 10 in FIGS. 5-13 is either the battery mounting unit 100 of the bus 2 or the battery stand formed on the loader, but the following description will be limited to the battery mounting unit 100 of the bus 2, for convenience of description.

Initially, as shown in FIG. 5, a battery 10 is mounted and retained on the battery mounting unit 100 of the bus 2.

Particularly, the engaging rods 104, which protrude from the bottom portion 102 of the battery mounting unit 100, are inserted vertically into the coupling holes 12 of the battery 10 to prevent the battery 10 from moving forwards/backwards/leftwards/rightwards. In addition, the grasping holders 106 of the battery mounting unit 100 are maintained upright by the elastic members (springs) 112, so that the stepped portions 108 of the grasping holders 106 remain seated horizontally on and engaged with the upper portions of the engaging ledges 16 of the upper surface incisions 14 of the battery 10, which remains retained and mounted without moving vertically.

In this state, the battery attaching/detaching unit 300 is positioned on the same vertical line with the battery mounting unit 100 by the movement device 200. Particularly, the variable guide rail 220 moves horizontally along X-axis or Y-axis with regard to the fixed guide rails 210 of the loader, and the movable rail 230 moves horizontally along Y-axis or X-axis with regard to the variable guide rail 220 to be positioned on the same vertical line with the battery mounting unit 100.

The grasping units 310 of the battery attaching/detaching unit 300 are unfolded outwards in response to electric signals; the disengaging units 320 are folded inwards into a vertical condition in response to electric signals; and the movable rail 230 descends along Z-axis with regard to the variable guide rail 220. As a result, the battery 10 is separated from the battery mounting unit 100 and then grasped.

Figure 6:
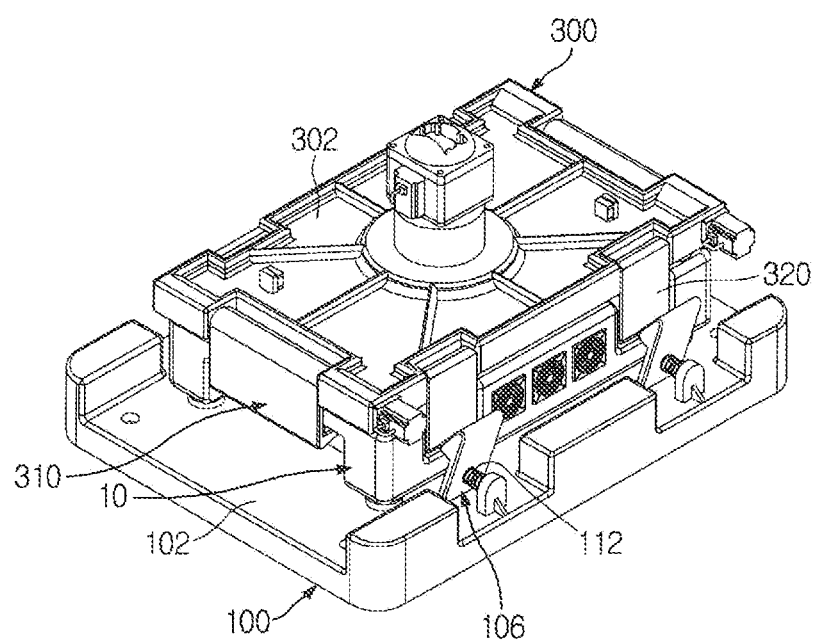
Figure 7:
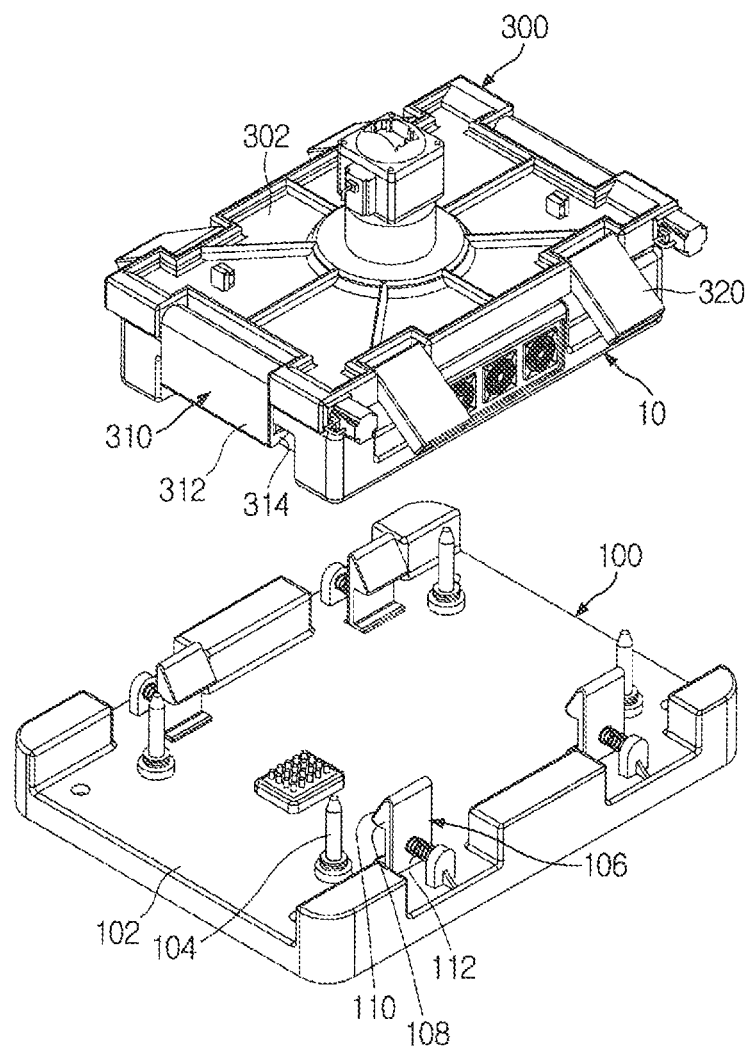

Specifically, as shown in FIGS. 6 and 7, when the battery attaching/detaching unit 300 descends, the disengaging units 320 slide through the slanted surfaces 110 of the grasping holders 106 of the battery mounting unit 100 and enter into the upper surface incisions 14 of the battery 10. Then, the grasping holders 106 of the battery mounting unit 100 unfold outwards while compressing the elastic members 112 and thus release the battery 10 from the vertical engagement.

Next, the grasping units 310 of the battery attaching/detaching unit 300 fold inwards into a vertical condition in response to electric signals, so that the horizontal portions 314 of the grasping unit 310 enter into the lower surface incisions 18 of the battery 10 and horizontally engage beneath the engaging ledges 20 of the lower surface incisions 18.

In this state, the movable rail 230 is raised along Z-axis with regard to the variable guide rail 220 so that the battery attaching/detaching unit 300 ascends together. The battery 10, which is engaged and grasped by the grasping portions 310 of the battery attaching/detaching unit 300, ascends simultaneously.

The engaging rods 104 of the battery mounting unit 100, which are vertically inserted into the coupling holes 12 of the battery 10, do not interfere with the rising battery 10. When the battery 10 rises together with the battery attaching/detaching unit 300, the grasping holders 106 of the battery mounting unit 100 are rotated to the original condition (vertical condition) by restoring force from the elastic members 112.

As such, the battery attaching/detaching unit 300 grasps the battery 10 and ascends along Z-axis; the movable rail 230 horizontally moves along Y-axis or X-axis with regard to the variable guide rail 220; the variable guide rail 220 horizontally moves along X-axis or Y-axis with regard to the fixed guide rails 210 to be positioned on the same vertical line with the battery stand of the loader; and the movable rail 230 again descends along Z-axis to mount the battery 10 on the battery stand.

It is to be noted that the process of mounting the battery 10 on the battery stand of the loader by the battery attaching/detaching unit 300 is identical to the process of mounting the battery 10 on the battery mounting unit 100 of the bus 2, as will be described later.

Next, the movable rail 230 moves along X-axis/Y-axis/Z-axis so that the battery attaching/detaching unit 300 picks up a fully-charged battery, which is mounted on another battery stand of the loader, through the same process as that of picking up a battery 10 from the battery mounting unit 100 of the bus 2, as described above, and the movable rail 230 again moves along X-axis/Y-axis/Z-axis so that the battery attaching/detaching unit 300 is positioned on the same vertical line on top of the battery mounting unit 100 of the bus 2.

Figure 8:
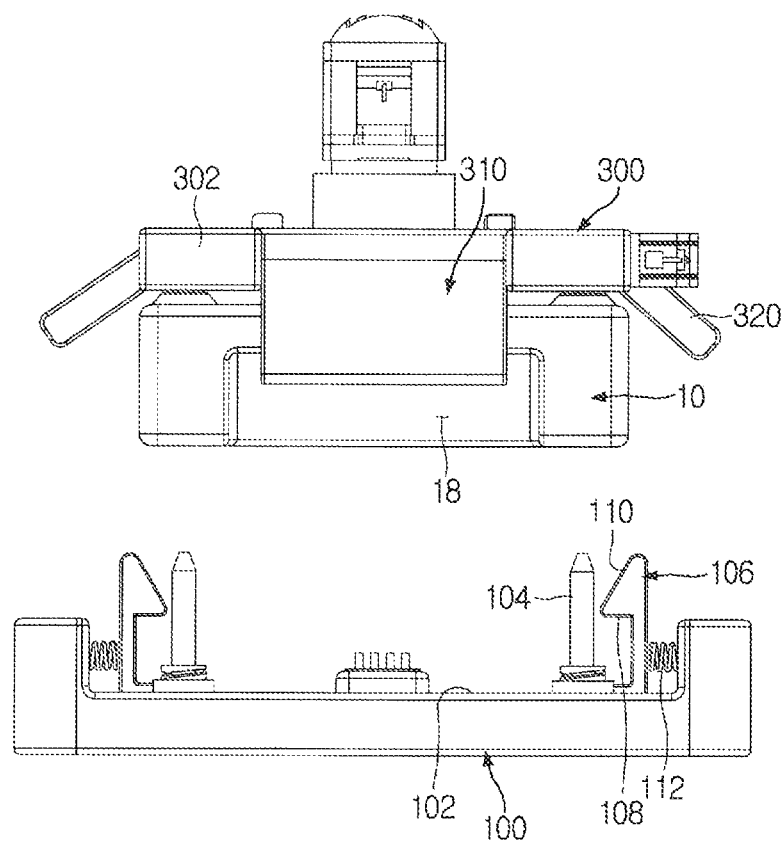

While the battery attaching/detaching unit 300 is grasping the battery 10, as shown in FIGS. 7 and 8, the disengaging units 320 of the battery attaching/detaching unit 300, which have been introduced into the upper surface incisions 14 of the battery 10, unfold outwards in response to electric signals. This is for the purpose of preventing interference with the grasping holders 106 which, when the battery 10 is lowered and mounted on the battery mounting unit 100, enter into the upper surface incisions 14 of the battery 10 and grasp them.

Figure 9:
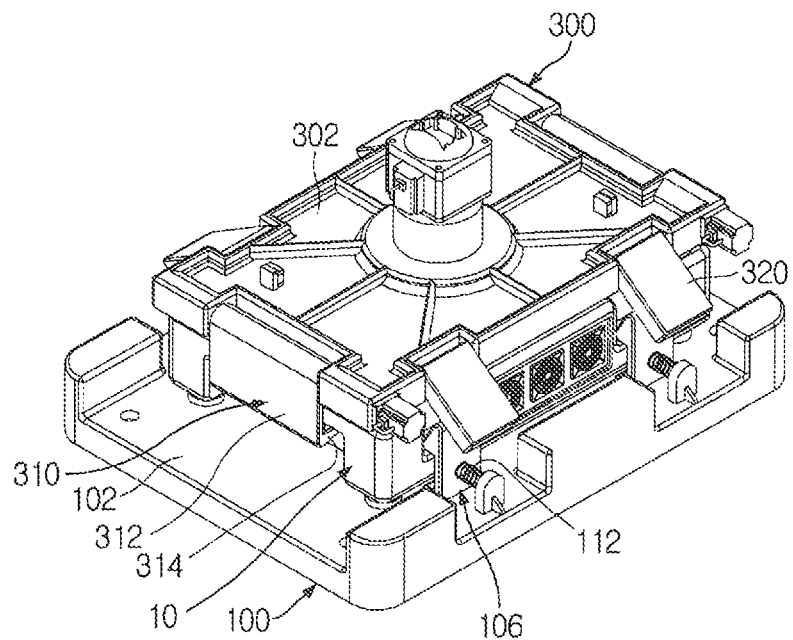
Figure 10:
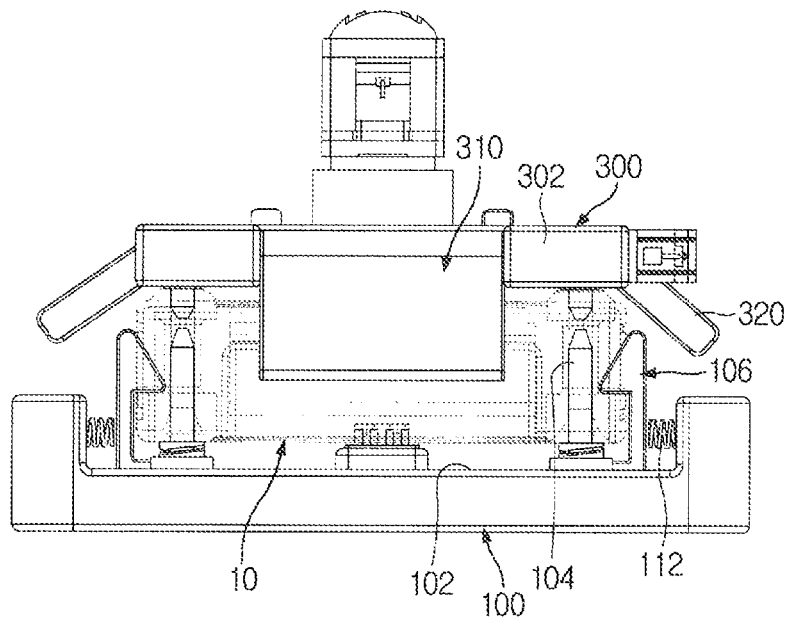

In this state, the movable rail 230 descends along Z-axis with regard to the variable guide rail 220. Then, as shown in FIGS. 9 and 10, the bottom portion of the battery 10, particularly the bottom portion below the engaging ledges 16 of the upper surface incisions 14 slides along the slanted surfaces 110 of the grasping holders 106 of the battery mounting unit 100 and keeps descending while unfolding the grasping holders 106 outwards.

At the same time, the engaging rods 104 of the battery mounting unit 100 are inserted into the coupling holes 12 of the battery 10.

The battery attaching/detaching unit 300 and the battery 10 keep descending to be seated on the bottom portion 102 of the battery mounting unit 100 so that the stepped portions 108 of the grasping holders 106 are positioned above the upper surface incisions 14 of the battery 10. Then, the grasping holders 106 are again folded inwards by elastic restoring force from the elastic members 112 until they stand upright. As a result, the stepped portions 108 of the grasping holders 106 are positioned horizontally on the engaging ledges 16 of the upper surface incisions 14 of the battery 10 and engage with them, thereby constraining vertical movement of the battery 10.

The engaging rods 104 of the battery mounting unit 100 are, as described above, inserted into the coupling holes 12 of the battery 10, which is constrained without moving in forwards/backwards/leftwards/rightwards.

Figure 11:
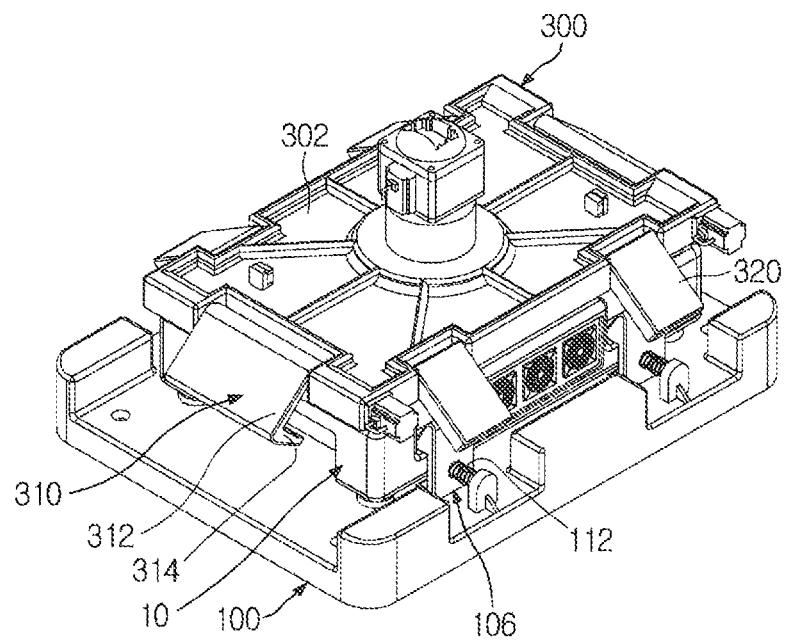
Figure 12:
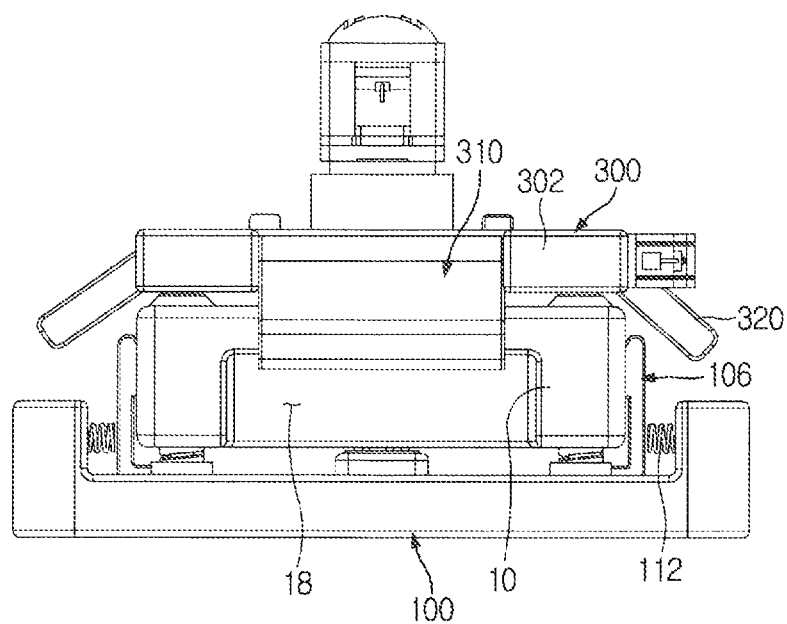
Figure 13:
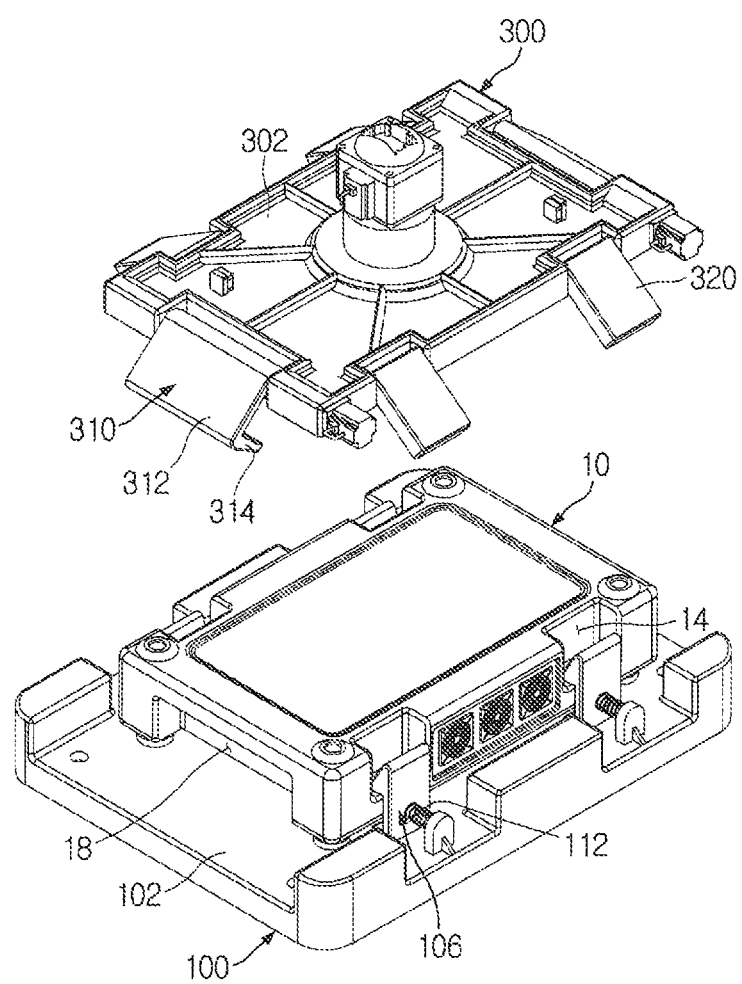

In this state, the grasping units 310 of the battery attaching/detaching unit 300 are hinge-rotated and unfolded outwards by electric signals, as shown in FIGS. 11-13, so that the horizontal portions 314 of the grasping units 310 disengage from the engaging ledges 20 of the lower surface incisions 18 of the battery 10. Then, the movable rail 230 ascends along Z-axis together with the battery attaching/detaching device while the completely-charged battery is retained and mounted on the battery mounting unit 100 of the bus 2.

Therefore, the discharged battery of the bus 2 can be easily and quickly exchanged with a fully-charged battery mounted on the battery stand of the loader.

Second Embodiment

Figure 14:
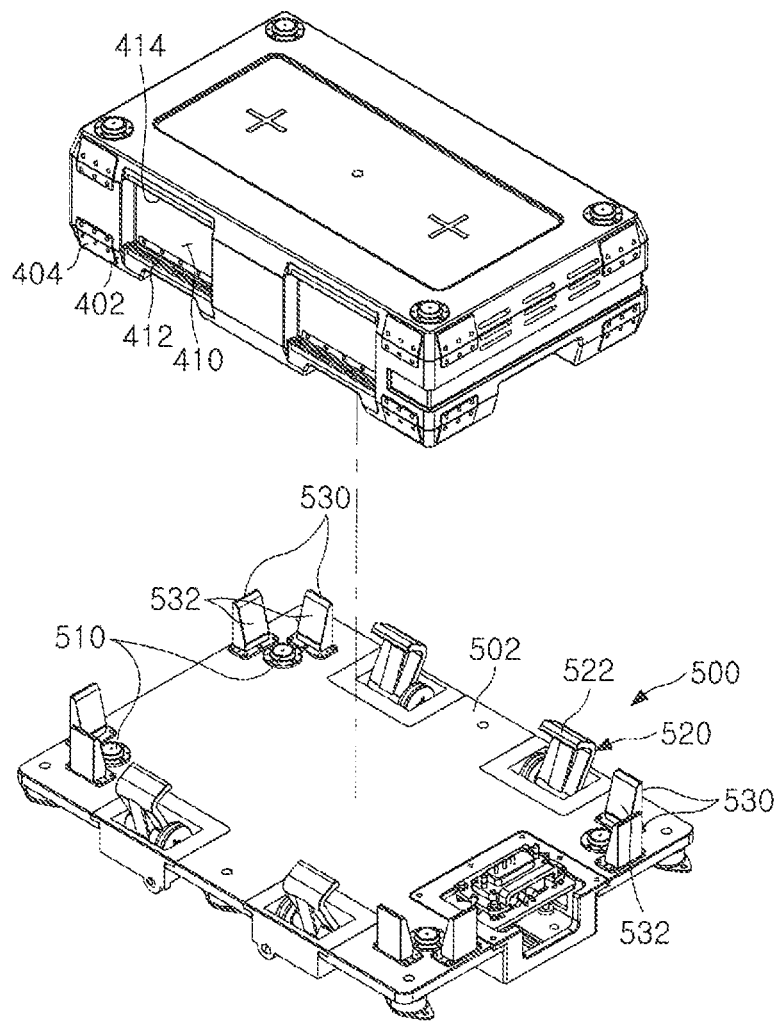
FIG. 14 is an exploded perspective view of a battery and a battery mounting unit of an electric vehicle battery attaching/detaching device according to a second embodiment of the present invention.
Figure 15:
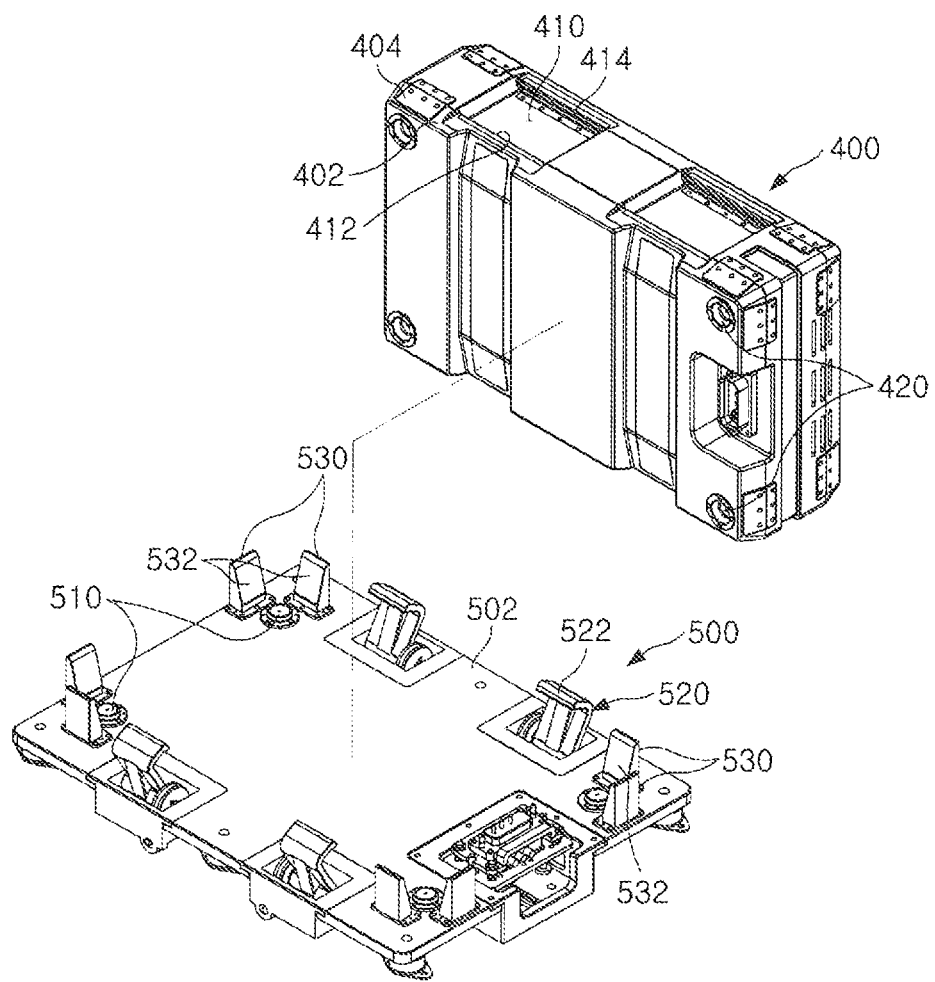
FIG. 15 is an exploded perspective view revealing the bottom structure of the battery shown in FIG. 14.
Figure 16:
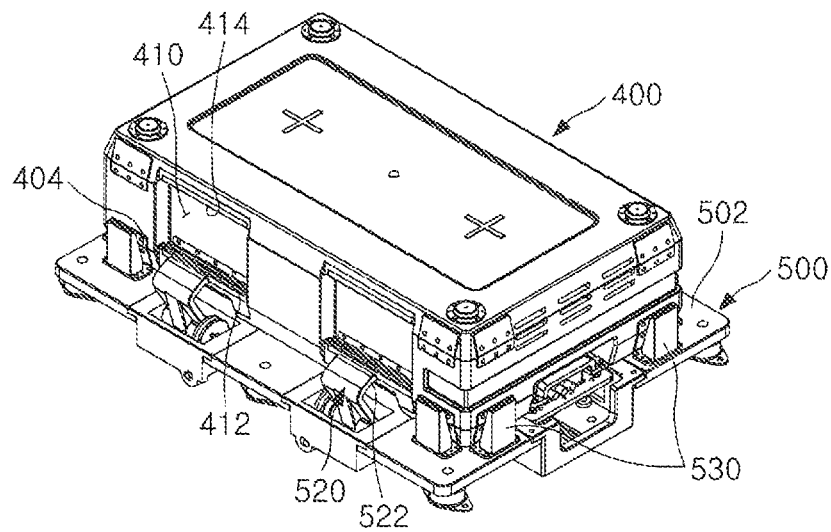
FIG. 16 is an assembled perspective view of FIG. 14.
Figure 17:
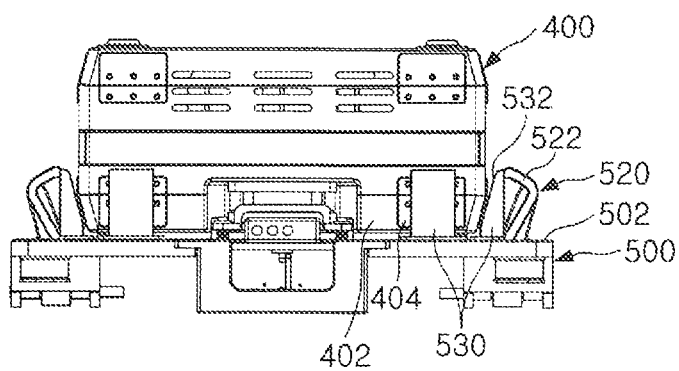
FIGS. 17 and 18 are front and lateral views of FIG. 16.
Figure 18:
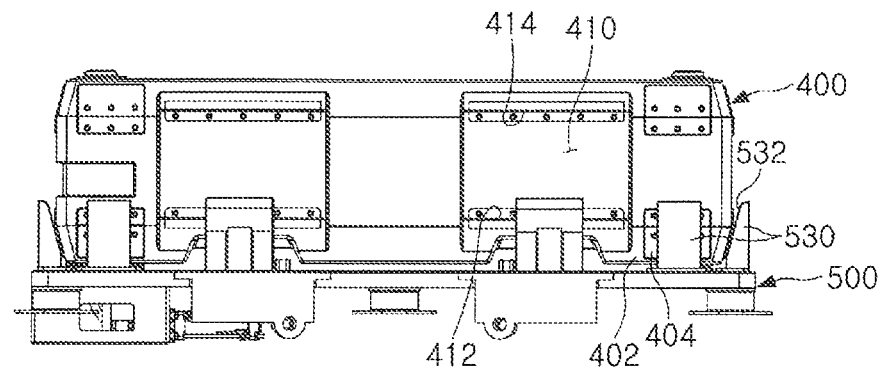

FIG. 14 is an exploded perspective view of a battery and a battery mounting unit of a electric vehicle battery attaching/detaching device according to a second embodiment of the present invention; FIG. 15 is an exploded perspective view revealing the bottom structure of the battery shown in FIG. 14; FIG. 16 is an assembled perspective view of FIG. 14; and FIGS. 17 and 18 are front and lateral views of FIG. 16.

As shown, the electric vehicle battery attaching/detaching device according to the second embodiment of the present invention includes a loader (not shown) having a plurality of batteries, charging of which has been completed (hereinafter, referred to as fully-charged batteries), loaded thereon; an electric vehicle battery mounting unit 500; and a battery attaching/detaching unit (not shown in the second embodiment) adapted to move between the battery mounting unit 500 and the loader along X-axis, Y-axis, and Z-axis by means of a movement device (not shown in the second embodiment), detach a battery mounted on the battery mounting unit 500 or the loader, and again exchange/mount the battery on the loader or the battery mounting unit 500.

It will be assumed in the description of the second embodiment of the present invention that the electric vehicle is a bus 2.

The battery attaching/detaching unit is supposed to move along X-axis, Y-axis, and Z-axis with regard to the loader, which has a plurality of fully-charged batteries loaded thereon, and the battery mounting unit 500 of the bus 2. To this end, the battery mounting unit 500 is preferably installed on top of the bus 2, and the loader of fully-charged batteries is preferably positioned higher than the bus 2.

The battery attaching/detaching unit is moved by the movement device along X-axis, Y-axis, and Z-axis with regard to the loader and the battery mounting unit 500 of the bus 2. The movement device has the same construction and functionality as the movement device 200 according to the first embodiment, and repeated description thereof will be omitted herein.

The construction according to the second embodiment of the present invention includes a battery attaching/detaching unit, a battery 400, and a battery mounting unit 500 or a battery stand, as in the case of the first embodiment, and the organic functionality is the same or substantially similar, except for detailed constructional differences for better operational effects, which will be described later in detail.

The structure of the battery 400, which is applied to the second embodiment of the present invention, will now be described.

The battery 400 applied to a battery attaching/detaching device according to the second embodiment of the present invention has cone-type recesses 420 of a small depth formed near respective corners, so that the battery 400 is retained at the accurate location on the battery mounting unit 500 of the bus 2 or on the battery stand of the loader. The battery 400 also has incision recesses 410 formed on both lateral surfaces, respectively, and each incision recess 410 has upper and lower engaging ledges 414 and 412 formed at a predetermined height from the bottom and top portions, respectively.

The cone-type recesses 420 have a cone shape, i.e. the interval is large at the entering end and decreases inwards.

The battery 400 has taper surfaces 402 formed on lower portions of respective lateral surfaces up to a predetermined height and inclined by a predetermined angle so that the sectional area decreases downwards. The inclination angle of the taper surfaces 402 is preferably about 10-20°, most preferably 15°.

The battery 400 has anti-wear cover plates 404 coupled to respective ends of front, rear, left, and right surfaces near the corners so as to straddle the surfaces by a predetermined interval. Particularly, the anti-wear cover plates 404 are coupled to respective ends of front, rear, left, and right surfaces of the battery 400, near the corners, so as to straddle the taper surfaces 402 and front, rear, left, and right surfaces near the upper portions of the taper surfaces 402 by a predetermined interval.

The anti-wear cover plates 404 are preferably made of a special alloy material having sufficient resistance to wear to endure frequent friction with guide pieces 530 of the battery mounting unit 500 (described later) and resulting heat.

Specifically, the anti-wear cover plates 404 are preferably adapted to be attached/detached to/from the battery so that they can solely be replaced when worn by frequent friction and resulting heat.

The battery 400 of the above-mentioned construction is mounted while being retained by the battery mounting unit 500 or the battery stand (described later).

The battery mounting unit 500 and the battery stand have the same construction, so the following description will be made only in connection with the battery mounting unit 500.

The battery mounting unit 500 has a bottom portion 502 of a predetermined area, on which a battery 400 is to be seated and supported. The bottom portion 502 has cone-type protrusions 510 of a small height formed to be inserted into the cone-type recesses 420 formed on corners of the bottom portion 402 of the battery 400.

The cone-type protrusions 510 have a cone shape, i.e. the interval is small at the front end but increases downwards.

Therefore, when the cone-type protrusions 510 of the battery mounting unit 500 are inserted into the cone-type recesses 420 of the battery 400, the fact that the front end of each cone-type protrusion 510 is narrower than the entering end of each cone-type recess 420 makes the introduction process easy, as will be described later.

The inclination angle of the cone-type recesses 420 and the cone-type protrusions 510 is preferably about 60°.

The battery mounting unit 500 has grasping holders 520 formed on both sides of the bottom portion 502 and adapted to engage with or disengage from the lower engaging ledges 412 of the battery incision recesses 410. The grasping holders 520 are adapted to rotate by a predetermined angle about the center axis, in response to electric signals, to engage with or disengage from the lower engaging ledges 412.

The grasping holders 520 have stepped portions 522 adapted to horizontally engage with the lower engaging ledges 412 formed on the incision recesses 410 of the battery.

The battery mounting unit 500 has guide pieces 530 installed near respective front, rear, left, and right corners of the bottom portion 502 to guide the battery 400 in such a manner that, when it descends to the battery mounting unit 500, they make contact with the anti-wear cover plates 404 of the battery 400 and cause the battery to be seated in the right position through sliding.

Each guide piece 530 has a slanted surface 532 formed on its inner surface at the same angle as the taper surface 402 of the battery, i.e. 10-20°.

Therefore, as shown in FIGS. 17 and 18, when the battery 400 is seated on the battery mounting unit 500 or the battery stand, the cone-type protrusions 510 are inserted into the cone-type recesses 420 of the battery and prevent the battery 400 from moving horizontally forwards/backwards/leftwards/rightwards, and the stepped portions 522 of the grasping holders 520 horizontally engage with the lower engaging ledges 412 of the battery incision recesses 410 and prevent the battery 400 from moving vertically upwards/downwards, so that the battery 400 remains retained and grasped.

The battery attaching/detaching unit, although not separately shown in the second embodiment, is installed on the lower end of the movable rail to move along X-axis, Y-axis, and Z-axis, and may include a main unit having a shape and a size corresponding to those of the battery 400 and grasping units formed on both lateral surfaces of the main unit, respectively, and adapted to make hinge rotation vertically and horizontally in response to electric signals.

The grasping units are positioned to vertically correspond to the incision recesses 410 of the battery 400 and have the corresponding number. Each grasping unit may include a vertical unit adapted to make hinge rotation vertically or horizontally in response to an electric signal and a horizontal unit extending from an end of the vertical unit in a perpendicular direction. The horizontal units horizontally engage with the upper engaging ledges 414, which are formed on the incision recesses 410 of the battery 400, when the grasping units are folded, and thus grasp the battery 400.

An operational process of exchanging a battery, which is retained and mounted on the battery mounting unit 500 of the bus 2 or the battery stand of the loader, using the battery attaching/detaching device of the above-mentioned construction will now be described.

It is to be noted that the battery mounting unit 500 of the bus 2 and the battery stand formed on the loader have the same structure, as mentioned above, meaning that the structure that mounts a battery 400 in FIGS. 14-18 is either the battery mounting unit 500 of the bus 2 or the battery stand formed on the loader, but the following description will be limited to the battery mounting unit 500 of the bus 2, for convenience of description.

While the battery attaching/detaching unit is grasping the battery 400, the movable rail moves along Z-axis, X-axis, and Y-axis to position it on the same vertical line above the battery mounting unit 500 of the bus 2.

However, it is very likely that the battery mounting unit 500 of an electric vehicle may not be positioned on the same vertical line with the battery attaching/detaching unit of the movement device but displaced to some extent for various reasons, e.g. tire air pressure difference, concentrated distribution of passengers, the driver's difficulty in stopping the electric vehicle at the accurate exchange location, etc.

Therefore, even if the battery 400, which is grasped by the battery attaching/detaching unit, and the battery mounting unit 500 are not located on the same vertical line but are displaced to some extent, the descending battery attaching/detaching unit can mount the battery 400 on the battery mounting unit 500 as long as the degree of displacement is within a predetermined tolerance range.

Obviously, if the degree of displacement between the battery attaching/detaching unit, which grasps the battery 400, and the battery mounting unit 500 is outside the predetermined tolerance range, the bus needs to be driven and stopped again, without lowering the battery attaching/detaching unit, to be within the tolerance range.

Assuming that the degree of displacement between the battery attaching/detaching unit, which grasps the battery 400, and the battery mounting unit 500 is within the tolerance range, as mentioned above, the movable rail descends along Z-axis with regard to the variable guide rail. If the periphery of the bottom portion of the battery 400 is positioned inside the guide pieces 530, which are installed near respective corners of the battery mounting unit 500, and if at least one part makes contact, the battery attaching/detaching unit releases the battery 400, which then descends due to its own weight.

Then, as shown in FIGS. 14, 16, 17, and 18, the anti-wear cover plates 404, which straddle the taper surfaces 402 near respective corners of the battery 400 and lateral surfaces, slide along the slanted surfaces 532 of the guide pieces 530 installed near respective corners of the bottom portion 502 of the battery mounting unit 500 so that the battery 400 and the battery mounting unit 500 are positioned in place, i.e. positioned on the same vertical line, and seated.

At the same time, the cone-type protrusions 510 of the battery mounting unit 500 are inserted into the cone-type recesses 420 of the battery 400.

The bottom portion of the battery 400 has taper surfaces 402 formed on lower portions of the lateral surfaces so that the sectional area of the bottom portion decreases downwards, as described above. Respective guide pieces 530 formed near respective corners of the bottom portion 502 of the battery mounting unit 500 also have slanted surfaces 532, so that the sectional area joining the upper ends is larger than the sectional area of the bottom portion of the battery. As a result, even if the battery 400 is slanted or twisted with regard to the same vertical line shared by the battery mounting unit 500 within a predetermined tolerance range, the battery 400 can be introduced and accurately set up.

The fact that the interval of the front end of each cone-type protrusion 510 of the battery mounting unit 500 is smaller than the entering end of each cone-type recess 420 of the battery 400 makes the introduction easy.

After the battery 400 is seated at the accurate location on the bottom portion 502 of the battery mounting unit 500, the grasping holders 520 of the battery mounting unit 500 are folded inwards by power means to reach an upright position. Then, the stepped portions 522 of the grasping holders 520 are horizontally positioned on top of the lower engaging ledges 412 of the incision recesses 410 of the battery 400 and engage with them, thereby constraining vertical movement of the battery 400.

A process of mounting the battery 400 onto the battery mounting unit 500, when the battery attaching/detaching unit, which is grasping the battery 400, and the battery mounting unit 500 are displaced from the same vertical line within a predetermined tolerance range, has been described. However, no process of detaching the battery 400 from the battery mounting unit 500 using the battery attaching/detaching unit has been described. This is because the battery attaching/detaching unit has no difficulty in picking up the battery, as long as the displacement from the same vertical line is within a predetermined tolerance range, in which case the grasping units can fold and engage with the upper engaging ledges 414 of the incision recesses 410 of the battery 400.

As such, the electric vehicle battery attaching/detaching device according to the second embodiment of the present invention can easily exchange a discharged battery of a bus 2 with a fully-charged battery on the battery stand of the loader within a short period of time.

Third Embodiment

The construction and functionality according to the third embodiment of the present invention are the same as those in the case of the second embodiment, except that the grasping holders 520 installed on the battery mounting unit 500 are adapted to mechanically unfold or fold to remain firmly engaged with the lower engaging ledges 412 of the battery incision recesses 410. Therefore, identical components are given the same reference numerals, and repeated descriptions thereof will be omitted herein.

Figure 19:
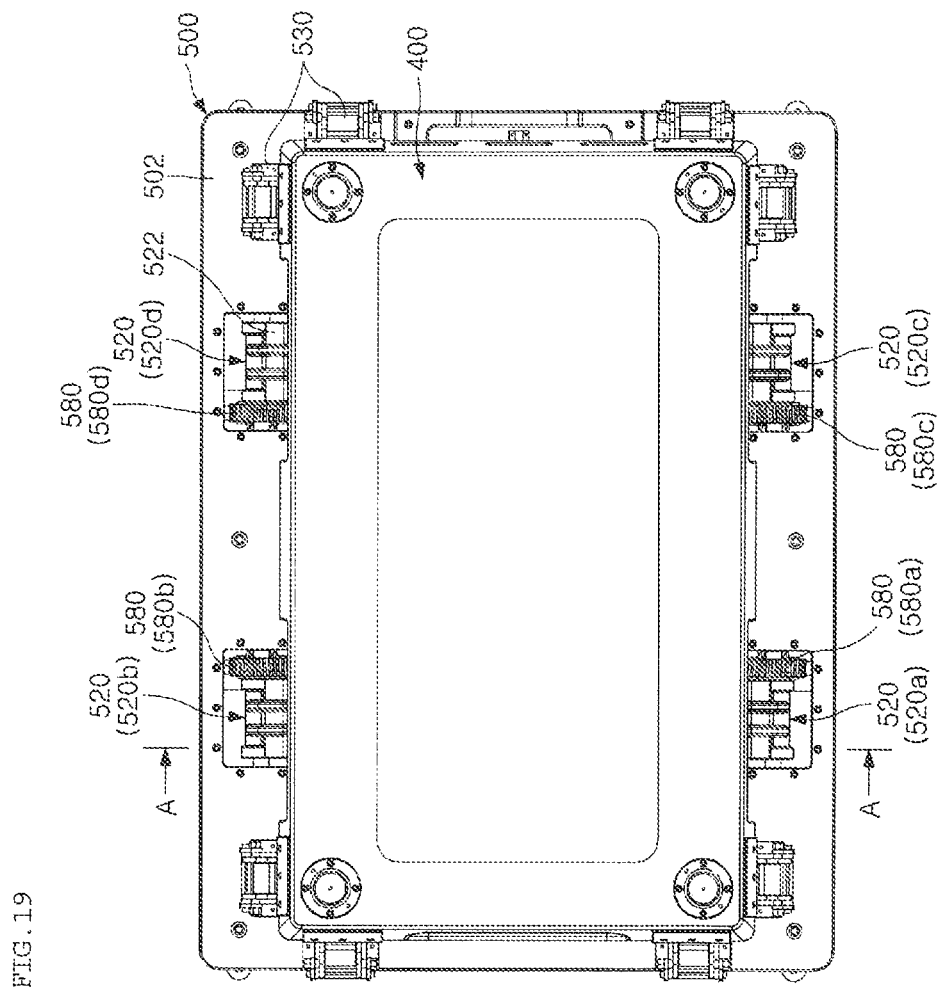
FIG. 19 is a top view of a battery mounted on a battery mounting unit according to a third embodiment of the present invention.
Figure 20:
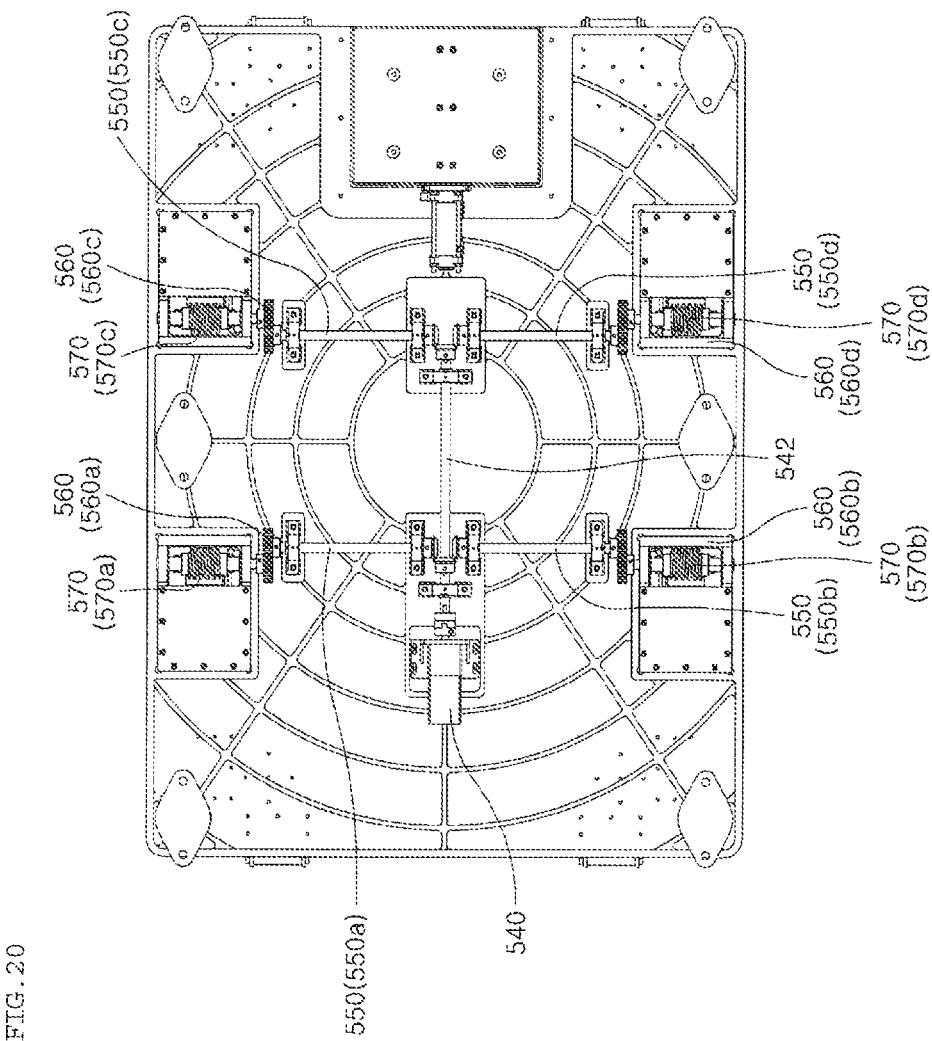
FIG. 20 is a bottom view of FIG. 19.
Figure 21:
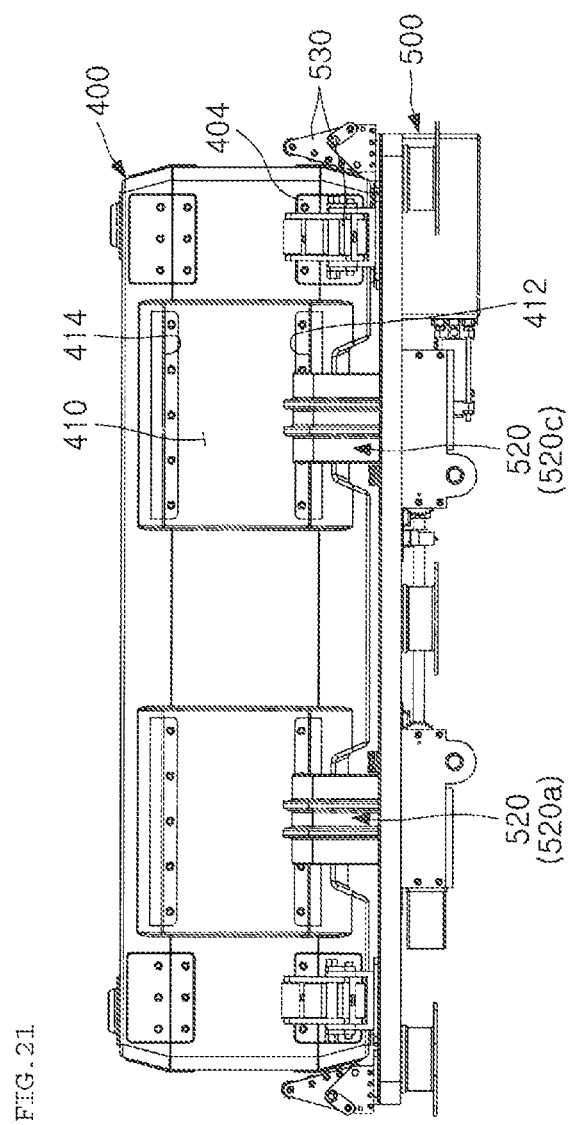
FIG. 21 is a front view of FIG. 19.
Figure 22:
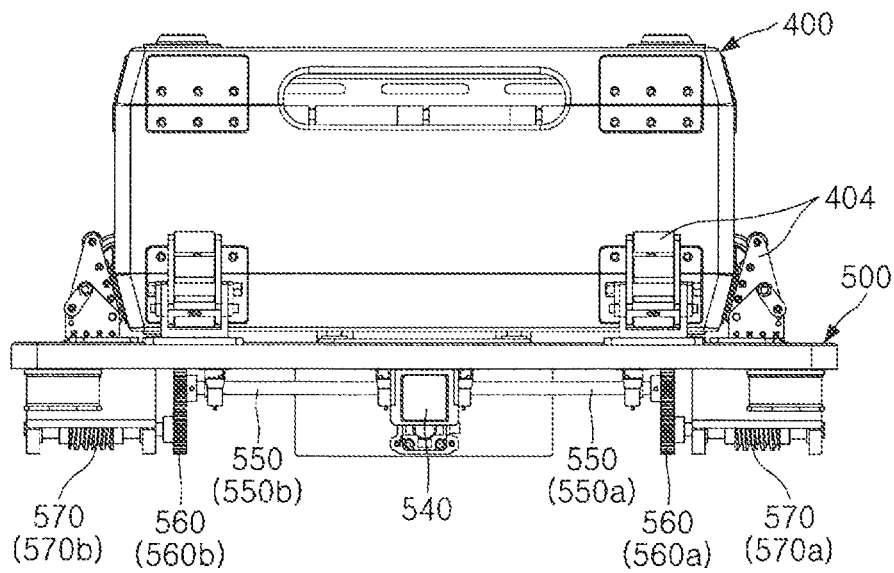
FIG. 22 is a lateral view of FIG. 19.

FIG. 19 is a top view of a battery mounted on a battery mounting unit according to the third embodiment of the present invention; FIG. 20 is a bottom view of FIG. 19; FIG. 21 is a front view of FIG. 19; and FIG. 22 is a lateral view of FIG. 19.

Figure 23:
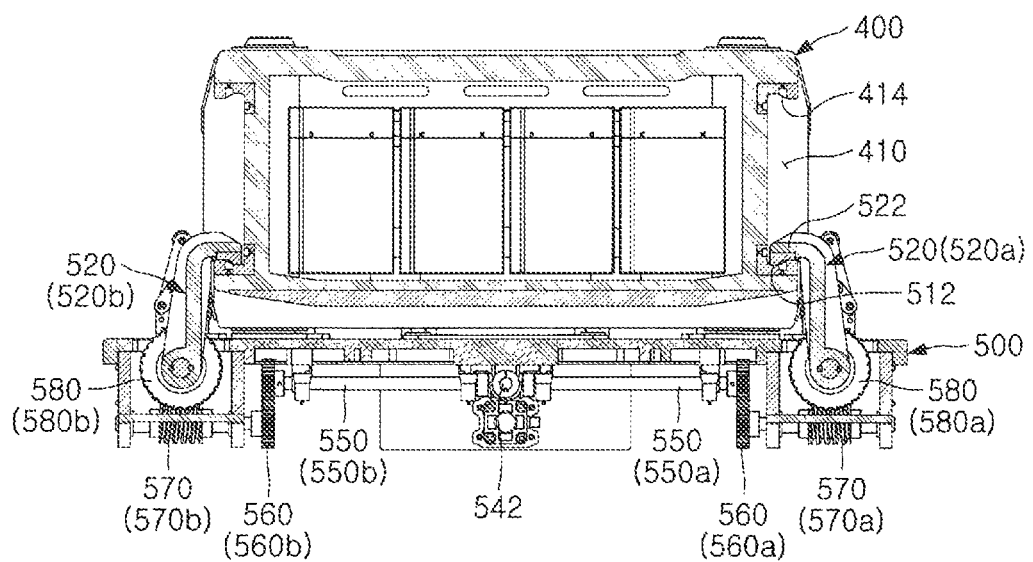
FIG. 23 is a sectional view taken along line A-A of FIG. 19.
Figure 24:
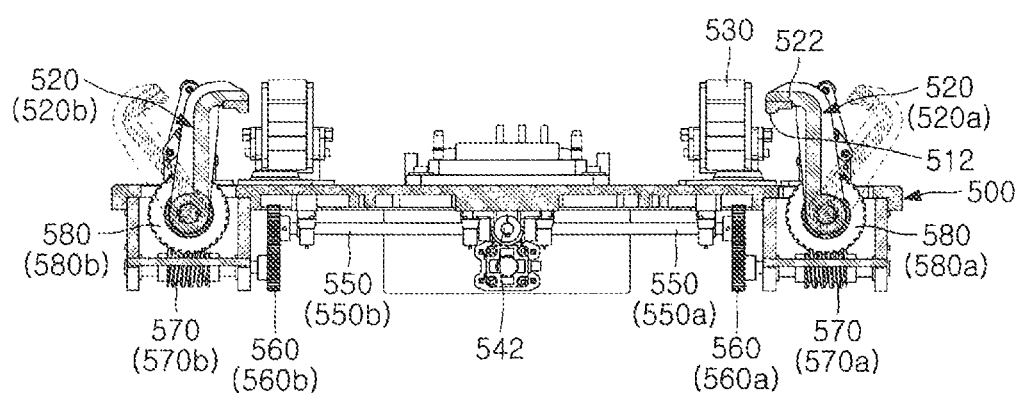
FIG. 24 is a sectional view solely illustrating the battery mounting unit shown in FIG. 23.

In addition, FIG. 23 is a sectional view taken along line A-A of FIG. 19, and FIG. 24 is a sectional view solely illustrating the battery mounting unit shown in FIG. 23.

As shown, the battery mounting unit 500 has grasping holders 520 formed on both sides of the bottom portion 502 and adapted to engage with or disengage from the lower engaging ledges 412 of the battery incision recesses 410. The grasping holders 520 are electrically/mechanically operated by a controller to rotate a predetermined angle about their center shafts and engage with or disengage from the lower engaging ledges 412.

The grasping holders 520 have stepped portions 522 formed to horizontally engage with the lower engaging ledges 412 formed on the incision recesses 410 of the battery.

It is to be noted that, although two grasping holders 520 are formed in parallel on each side of the bottom portion 502 of the battery mounting unit 500 (i.e. a total of four grasping holders 520a, 520b, 520c, 520d), together with a corresponding number (i.e. four) of incision recesses 410 of the battery, the number is not limiting but is exemplary.

The grasping holders 520 are operated by a driving motor 540, which is driven by an electric signal, so that, concurrent with the forward/backward rotation of the driving motor 540, the grasping holders 520 fold inwards to engage with the battery incision recesses 410 or unfold outwards to disengage from the battery incision recesses 410, which will now be described in more detail.

As shown in FIGS. 20-24, a driving motor 540 is installed on the rear surface of the battery mounting unit 500 and is driven by an electric signal.

The driving motor 540 has a shaft connected to a driving shaft 542 along a straight line, and the driving shaft 542 has bevel gears installed on its front and rear ends, respectively. The bevel gears of the driving shaft 542 mesh with bevel gears installed on first ends of driven shafts 550 (550a, 550b, 550c, 550d), which are connected to the driving shaft 542 in a perpendicular direction, respectively.

Therefore, driving of the driving motor 540 and following rotation of its shaft cause the driving shaft 542 to rotate together. The rotation is transmitted through the bevel gears of the driving shaft 542 to the driven shafts 550, the bevel gears of which mesh with the former in a perpendicular direction.

The driven shafts 550 have reduction gears 560 (560a, 560b, 560c, 560d) installed on their second ends and adapted to mesh with worm gears 570 (570a, 570b, 570c, 570d), respectively. The worm gears 570 mesh with worm wheels 580 (580a, 580b, 580c, 580d) installed on lower center shafts of the grasping holders 520, respectively.

The reduction gears 560 preferably have a two-stage reduction mechanism, i.e. include first reduction gears installed on the second ends of the driven shafts 550 and second reduction gears adapted to mesh with the first reduction gears and with the worm gears 570. If necessary, however, the worm gears 570 may be directly installed on the second ends of the driven shafts 550.

The operation of the grasping holders 520 of the battery mounting unit 500, which have the above-mentioned construction, will now be described.

When a battery 400 is mounted on the battery mounting unit 500, the grasping holders 520 are in an unfolded condition. After the battery 400 is seated in the accurate position on the bottom portion of the battery mounting unit 500, a corresponding signal is applied to the driving motor 540, which is then driven to fold the grasping holders 520 inwards.

That is, driving of the driving motor 540 is followed by rotation of the driving shaft 542, which is installed along the same axis with the shaft of the driving motor 540. The rotation is transmitted through the bevel gears, which are installed on the front and rear ends of the driving shaft 542, to the driven shafts 550, which have bevel gears installed on their first ends to mesh with the bevel gears of the driving shaft 542 in a perpendicular direction.

The reduction gears 560 installed on the second ends of the driven shafts 550 rotate accordingly, and the worm gears 570, which mesh with the reduction gears 560, rotate together. The worm wheels 580, which mesh with the worm gears 570, then rotate so that the grasping holders 520, which have the worm wheels 580 installed on their lower center shafts, rotate together and fold inwards.

The grasping holders 520 then stand upright, and their stepped portions 522 are horizontally positioned on the lower engaging ledges 412 of the incision recesses 410 of the battery and engaged with them, thereby constraining vertical movement of the battery 400.

Therefore, even if the bus undergoes severe vertical vibration during running (e.g. due to protrusions on the road) or turns upside down due to an accident, for example, the battery 400 remains firmly grasped by the grasping holders 520 of the battery mounting unit 500 and is prevented from escaping from the battery mounting unit 500.

On the other hand, when the battery 400 is to be detached from the battery mounting unit 500 and exchanged, the driving motor 540 is rotated backwards to unfold the grasping holders 520 outwards.

That is, when a battery exchange signal is applied to the driving motor 540 while the grasping holders 520 of the battery mounting unit 500 are folded to firmly grasp the incision recesses 410 of the battery, the driving motor 540 is driven backwards to unfold the grasping holders 520 outwards.

In other words, backward driving of the driving motor 540 is followed by backward rotation of the driving shaft 542, which is installed along the same axis with its shaft. The backward rotation is transmitted through the bevel gears, which are installed on the front and rear ends of the driving shaft 542, to the driven shafts 550, which have bevel gears installed on their first ends to mesh with the bevel gears of the driving shaft 542 in a perpendicular direction.

The reduction gears 560 installed on the second ends of the driven shafts 550 rotate backwards accordingly, and the worm gears 570, which mesh with the reduction gears 560, rotate backwards together. The worm wheels 580, which mesh with the worm gears 570, then rotate backwards so that the grasping holders 520, which have the worm wheels 580 installed on their lower center shafts, rotate backwards together and unfold outwards.

The grasping holders 520 are then slanted, as indicated by dotted lines in FIG. 24, and their stepped portions 522 disengage from the lower engaging ledges 412 of the incision recesses 410 of the battery and release the battery 400 from constraint on its vertical movement.

Technical ideas described in connection with embodiments of the present invention can be implemented independently or in combination. Although embodiments of the present invention have been described and illustrated, they are intended to be exemplary only, and various modifications and equivalents thereof will be obvious to those skilled in the art. The technical scope of the present invention is to be defined by the accompanying claims.

The invention claimed is:

1. An electric vehicle battery attaching/detaching device comprising:
a battery mounting unit formed on an electric vehicle and adapted to detachably mount a battery;
a loader having a plurality of battery stands, each battery stand being adapted to detachably mount a fully-charged battery to be exchanged with the battery mounted on the battery mounting unit; and
a battery attaching/detaching unit adapted to move along X-axis, Y-axis, and Z-axis between the battery mounting unit and the battery stand by means of a movement device, detach a battery mounted on the battery mounting unit or the battery stand, and exchange and mount the battery on the battery stand or the battery mounting unit,
wherein the battery has coupling holes formed near corners, upper surface incisions formed on both lateral portions, respectively, each upper surface incision having an engaging ledge formed at a predetermined height from a bottom portion, and lower surface incisions formed on front and rear portions, respectively, each lower surface incision having an engaging ledge formed at a predetermined height from a top portion.

2. The electric vehicle battery attaching/detaching device as claimed in claim 1, wherein the battery mounting unit comprises:
a bottom portion of a predetermined area so that the battery is seated and supported;
coupling protrusions extending a predetermined length in a direction perpendicular to the bottom portion, the coupling protrusions being positioned on an identical vertical line with the coupling holes of the battery; and
grasping holders adapted to engage with or disengage from the engaging ledges of the upper surface incisions of the battery by means of elastic force.

3. The electric vehicle battery attaching/detaching device as claimed in claim 2, wherein the grasping holders are adapted to make hinge rotation in a forward/backward direction by means of elastic members, the grasping holders have stepped portions formed to horizontally engage with the engaging ledges formed on the upper surface incisions of the battery, respectively, and a slanted surface portion is formed to be slanted upwards from an inner end surface of each stepped portion in an outward direction.

4. The electric vehicle battery attaching/detaching device as claimed in claim 1, wherein the movement device comprises:
a pair of fixed guide rails installed horizontally on the loader;
a variable guide rail installed on the fixed guide rails in a perpendicular direction thereto, wherein the variable guide rail moves horizontally along one of X-axis or Y-axis;
a movable rail adapted to move horizontally along the other of X-axis or Y-axis with regard to the variable guide rail, as well as move vertically along Z-axis, the battery attaching/detaching unit being installed on a lower end of the movable rail.

5. The electric vehicle battery attaching/detaching device as claimed in claim 2, wherein the battery attaching/detaching unit is installed on the movement device to be able to move along X-axis, Y-axis, and Z-axis, and the battery attaching/detaching unit comprises:
- a main unit shaped and sized in conformity with the battery;
- grasping units formed on front and rear surfaces of the main unit, respectively, and adapted to make hinge rotation vertically and horizontally in response to electric signals; and
- disengaging units formed on left and right surfaces of the main unit, respectively, and adapted to make hinge rotation vertically and horizontally in response to electric signals.

6. The electric vehicle battery attaching/detaching device as claimed in claim 5, wherein the grasping units are positioned to vertically correspond to the lower surface incisions of the battery and have a corresponding number, each grasping unit has a vertical unit adapted to make hinge rotation vertically or horizontally in response to an electric signal and a horizontal unit extending from an end of the vertical unit in a perpendicular direction, and the horizontal units are adapted to horizontally engage with the engaging ledges formed on the lower surface incisions of the battery, when the grasping units are folded, and grasp the battery.

7. The electric vehicle battery attaching/detaching device as claimed in claim 5, wherein the disengaging units are positioned to vertically correspond to the upper surface incisions of the battery and the grasping holders of the battery mounting unit and have a corresponding number.

8. The electric vehicle battery attaching/detaching device as claimed in claim 1, wherein the battery stand comprises:
- a bottom portion of a predetermined area so that the battery is seated and supported; and
- coupling protrusions extending a predetermined length in a direction perpendicular to the bottom portion, the coupling protrusions being positioned on an identical vertical line with the coupling holes of the battery.

9. The electric vehicle battery attaching/detaching device as claimed in claim 8, wherein grasping holders are installed on the bottom portion of the battery stand and adapted to engage with or disengage from the engaging ledges of the upper surface incisions of the battery by means of elastic force.

\* \* \* \* \*